T. V. BUCKWALTER.
CAST METAL WHEEL.
APPLICATION FILED DEC. 5, 1912.

1,069,598.

Patented Aug. 5, 1913.

WITNESSES:

INVENTOR
Tracy V. Buckwalter,
BY
Charles N. Butler
ATTORNEY.

UNITED STATES PATENT OFFICE.

TRACY V. BUCKWALTER, OF ALTOONA, PENNSYLVANIA.

CAST-METAL WHEEL.

1,069,598.  Specification of Letters Patent.  Patented Aug. 5, 1913.

Application filed December 5, 1912. Serial No. 735,053.

*To all whom it may concern:*

Be it known that I, TRACY V. BUCKWALTER, a citizen of the United States, residing at Altoona, in the county of Blair and State of Pennsylvania, have invented certain Improvements in Cast-Metal Wheels, of which the following is a specification.

My invention relates more particularly to traction wheels commonly made of cast iron and my primary object is to provide a novel construction that will avoid the usual shrinkage strains, permit a reduction in the size of the parts necessary to compensate for such strains in usual constructions, and provide for ready inspection and access to the parts carried by the wheel.

In cast metal wheels heretofore used on locomotives and cars, where radial spokes have been employed, it has been necessary to make parts thereof much heavier than would be required for the purpose of carrying the load, as large cross-sections are required to prevent flaws and compensate for shrinkage strains due to the unequal cooling of the metal. It has been proposed to use curved spokes or brackets for the purpose of providing means in the wheel compensating for unequal shrinkage, but such construction is not considered to be mechanically sound, and it has been considered necessary to provide reinforcing means in a solid disk or web which involves an added weight of metal, is subject to strains due to its more rapid cooling than the heavier parts, and prevents ready inspection and access to parts lying beyond it.

In my invention, in its preferred form, the cast metal wheel has its rim and hub connected by straight spokes similarly inclined to the radii or tangent to a circle concentric with the wheel. As the spokes are lighter or less in cross-sectional area than the hub and rim, such spokes solidify while the interiors of the hub and rim are still fluid or plastic and as these latter parts cool the metal of the hub turns about its axis relatively to the rim whereby there is an adjustment of the metal and an elimination of strains which would otherwise be set up.

Figure 1:
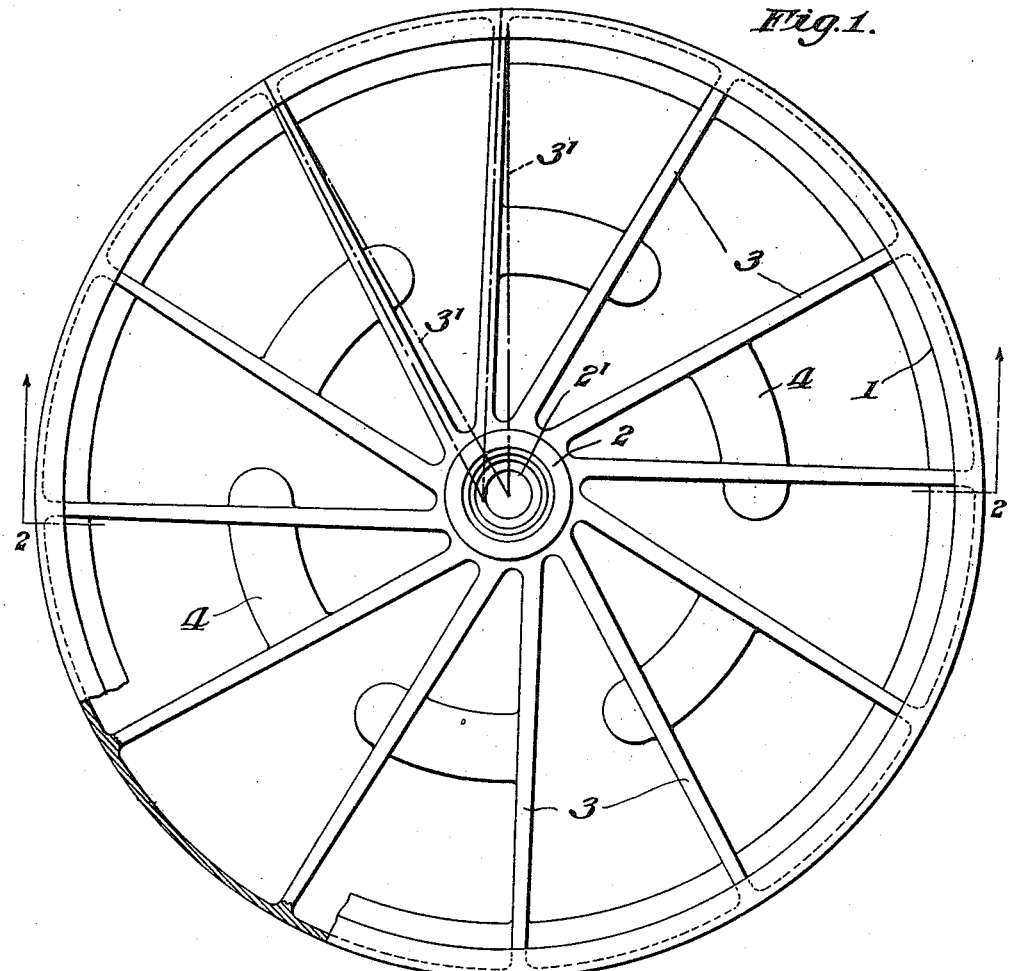
Figure 2:
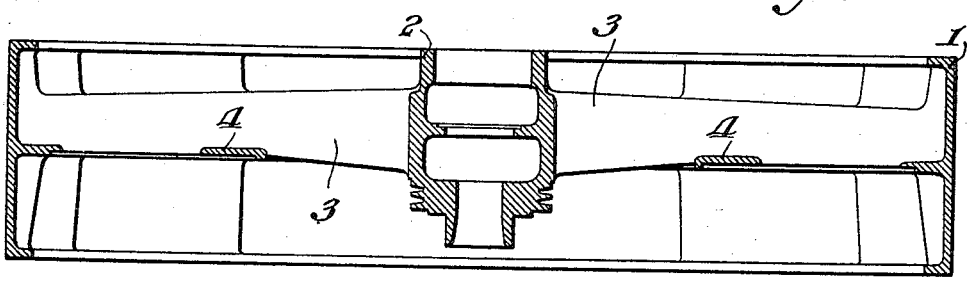

In the accompanying drawings, Figure 1 is a partly sectional elevation of a cast metal wheel embodying my invention, and Fig. 2 is a sectional view taken on the line 2—2 of Fig. 1.

The wheel, as illustrated in the drawings, comprises the integrally formed rim 1, hub 2, and spokes 3, the latter being connected in pairs by the parts 4. The spokes are tangent to a circle concentric with the wheel, as the circle 2', or similarly inclined to corresponding radial lines, as the lines 3'. Because the spokes are thus disposed with reference to the rim and hub, unequal shrinkage in cooling results in a turning movement of the hub relatively to the rim which avoids flaws and strains commonly existing in cast metal wheels of usual construction. The spokes 3 are connected in pairs by braces 4 which serve to carry a part of the lateral stress on a spoke to an adjacent spoke and to stiffen the construction, as well as to provide means for securing a frictional or toothed ring for braking or driving purposes.

Having described my invention, I claim:

1. A wheel having a rim, a hub, and spokes connecting them, said spokes being similarly inclined to each other and substantially tangent to a circle concentric to said wheel whereby a relative axial movement between said wheel and hub is permitted in casting.

2. A cast metal wheel having integrally connected a rim, a hub and spokes, all of which spokes are similarly inclined to each other and to radii intersecting corresponding parts thereof.

3. A cast metal wheel having an integrally connected rim, hub and substantially straight spokes, all of which spokes are similarly inclined to each other and to radii intersecting corresponding parts thereof.

4. A cast metal wheel comprising integrally formed rim, hub, spokes and braces connecting said spokes in pairs, said spokes being similarly inclined to each other and to radii intersecting corresponding parts thereof.

5. A cast metal wheel comprising a rim, a hub, and spokes connecting them, said spokes similarly inclined to each other, lines passing through the respective points of connection of said spokes with said rim and hub being substantially tangent to a circle having its center in the axis of said hub and inclined so that the contraction of said spokes turns said hub relatively to said rim.

In testimony whereof I have hereunto set my hand this 30th day of November, 1912, in the presence of the subscribing witnesses.

TRACY V. BUCKWALTER.

Witnesses:
 Jos. G. Denny, Jr.,
 Geo. A. Cunney.

Copies of this patent may be obtained for five cents each, by addressing the "Commissioner of Patents, Washington, D. C."